Patented Feb. 27, 1951

2,543,268

UNITED STATES PATENT OFFICE 2,543,268

ACYLATED KETO AMIDO ALCOHOLS

Louis L. Bambas, Grosse Pointe Woods, Mich., assignor to Parke, Davis & Company, Detroit, Mich., a corporation of Michigan No Drawing. Application January 4, 1950, Serial No. 136,834

8 Claims. (Cl. 260—490)

This application is a continuation in part of my co-pending application, Serial Number 83,778, filed March 26, 1949, now Patent No. 2,516,098, dated July 25, 1950, and the invention relates to acylated keto amido alcohols and to methods for obtaining the same. More particularly, the invention relates to biphenylyl acylamidoacyloxyethyl ketones having the formula,

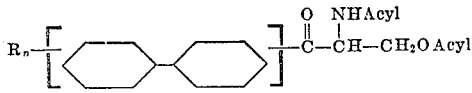

where $n$ is 1 or 2, and R is the same or different and represents hydrogen, halogen, nitro, lower alkyl, or lower alkoxy radicals. The term "acyl" as used herein includes saturated and unsaturated lower aliphatic acyl, halogen substituted lower aliphatic acyl, carboxy substituted lower aliphatic acyl, cyano substituted lower aliphatic acyl, ether substituted lower aliphatic acyl, ester substituted lower aliphatic acyl, hydroxy substituted lower aliphatic acyl, benzoyl, substituted benzoyl, araliphatic acyl, furoyl, pyridinoyl and the like radicals.

In accordance with the invention, biphenylyl α-acylamido-β-acyloxyethyl ketone compounds having the above formula are prepared by treating biphenylyl α-acylamido-β-hydroxyethyl ketone compounds having the formula,

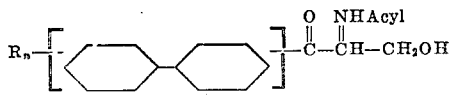

where R and $n$ have the same significance as given above, with an acyl halide or an acyl anhydride under substantially anhydrous conditions either alone or in the presence of an acylation catalyst. Some acylation catalysts which may be employed are an inorganic base, an alkaline salt of an organic acid, an organic tertiary base, an aromatic sulfonic acid or sulfuric acid. The acylation in general can be carried out at a temperature varying from about 10–140° C. but the preferred temperature for the reaction is between about 60 and 100° C. An inert organic solvent, such as benzene, petroleum ether, toluene and the like, can be used for the reaction if desired, although in most cases it is more expedient to omit the use of a solvent and merely use an excess of the acylating agent. Some of the catalysts which may be used to bring about the reaction in a shorter period of time are sodium hydroxide, potassium hydroxide, potassium carbonate, sodium acetate, pyridine, quinoline, triethylamine, N-ethyl morpholine, N-methyl piperidine, N,N-dimethyl aniline, p-toluene sulfonic acid and sulfuric acid.

The products of the invention are useful as intermediates in the preparation of other organic compounds. They are of particular value in the preparation of organic compounds possessing antibiotic activity against micro-organisms of the Rickettsia type.

The invention is illustrated by the following examples:

Example 1

10 g. of 2'-methyl-4-biphenylyl α-(p-toluylamido)-β-hydroxyethyl ketone is heated at about 75° C. for one-half hour with 20 cc. of acetic anhydride and one drop of concentrated sulfuric acid. The reaction mixture is evaporated to dryness in vacuo, the residue washed with ice water and purified by recrystallization from ethanol and methanol. The product thus obtained is 2'-methyl-4-biphenylyl α-(p-toluylamido)-β-acetoxyethyl ketone of the formula,

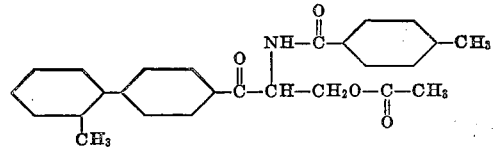

Example 2

A mixture consisting of 3 g. of 3-biphenylyl α-benzamido-β-hydroxyethyl ketone and 10 cc. of acetic anhydride is warmed to 40° C. and one drop of concentrated sulfuric acid is added to the solution. The mixture is allowed to stand for one-half hour and then is evaporated to dryness in vacuo. The residue which consists of 3-biphenylyl α-benzamido-β-acetoxyethyl ketone of the formula,

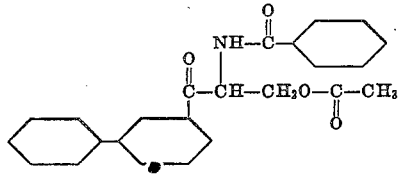

is washed with water and purified by recrystallization from ethanol.

Example 3

10 g. of 4'-nitro-4-biphenylyl α-acetamido-β-hydroxyethyl ketone is treated with 20 cc. of acetic anhydride and 0.1 g. of p-toluene sulfonic acid. This mixture is warmed to 40° C. and allowed to stand for one hour. After evaporating to dryness in vacuo, the reaction mixture is recrystallized from ethanol to yield 4'-nitro-4-biphenylyl α-acetamido-β-acetoxyethyl ketone having the formula,

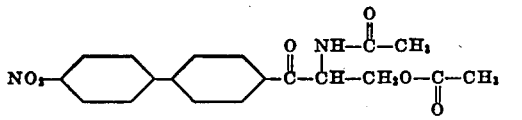

Example 4

A mixture consisting of 5 g. of 4'-nitro-4-biphenylyl α-dichloroacetamido-β-hydroxyethyl ketone and 10 cc. of acetic anhydride is warmed to 40° C. and one drop of concentrated sulfuric acid is added to the solution. The mixture is allowed to stand for one hour and is then evaporated to dryness in vacuo. The residue which consists of 4'-nitro-4-biphenylyl α-dichloroacetamido-β-acetoxyethyl ketone of the formula,

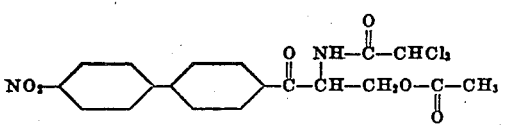

is washed with water and purified by recrystallization from ethanol.

Example 5

10 g. of 4'-nitro-4-biphenylyl α-dichloroacetamido-β-hydroxyethyl ketone and 10 g. of dicloroacetic anhydride is treated with 0.1 g. of p-toluene sulfonic acid. The mixture is heated to 50° C. and then allowed to stand for one hour. 100 ml. of water is added and the precipitated product, 4'-nitro-4-biphenylyl α-dichloroacetamido-β-dichloroacetoxyethyl ketone, is recrystallized from alcohol. It has the formula,

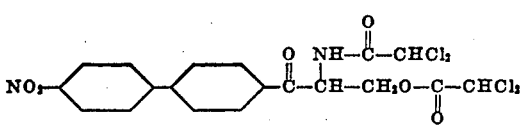

Example 6

1 g. of 2'-chloro-2-biphenylyl α-cyanoacetamido-β-hydroxyethyl ketone in 10 cc. of dry benzene is treated with 1 g. of nicotinoyl chloride. The mixture is allowed to stand for one hour and then treated with water. The benzene layer is separated, washed with dilute acid, sodium bicarbonate solution and finally with water. The benzene is removed by distillation in vacuo and the residue recrystallized from ethyl acetate to obtain the desired 2'-chloro-2-biphenylyl α-cyanoacetamido-β-nicotinoyloxyethyl ketone having the formula,

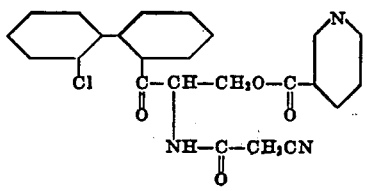

Example 7

5 g. of 4'-iodo-4-biphenylyl α-furamido-β-hydroxyethyl ketone is heated with 10 g. of ethyl lactate on a steam bath for three hours. After the evolution of ethanol has ceased, 100 cc. of water is added. The precipitated product, 4'-iodo-4-biphenylyl α-furamido-β-lactoyloxyethyl ketone, is collected, washed with water and recrystallized from ethyl acetate. It has the formula,

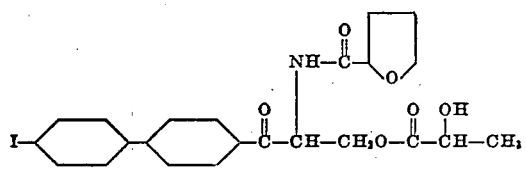

Example 8

3 g. of 2'-bromo-4'-methyl-4-biphenylyl α-acetoxyacetamido-β-hydroxyethyl ketone is added in small portions to a mixture consisting of 5 g. of dry pyridine and 3 g. of phenylacetyl chloride, keeping the temperature below about 5° C. After stirring for about one hour, 100 cc. of cold water is added and the precipitated product is collected. The product thus obtained is 2'-bromo-4'-methyl-4-biphenylyl α-acetoxyacetamido β-phenylacetoxyethyl ketone of the formula,

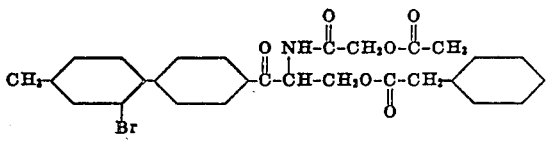

Example 9

A mixture consisting of 15 g. of 4'-methoxy-4-biphenylyl α-fluoroacetamido-β-hydroxyethyl ketone, 50 g. of benzoic anhydride and 6 g. of sodium acetate is heated to about 50° C. and stirred as small amounts of ice and water are added from time to time. After about one hour the mixture is diluted with 300 cc. of water, cooled, and adjusted to pH 8 with sodium hydroxide. The desired, 4'-methoxy-4-biphenylyl α-fluoroacetamido-β-benzoyloxyethyl ketone is collected. The product, which has the formula,

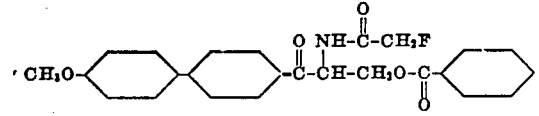

is dried in vacuo.

Example 10

1 g. of succinic anhydride is added to 3 g. of 4'-ethoxy-4-biphenylyl α-methoxypropionamido-β-hydroxyethyl ketone and the mixture is heated for thirty minutes. The reaction mixture is allowed to stand for two hours at 25° C. and is then treated with 100 cc. of water. After warming this mixture for thirty minutes, the precipitated product is collected. The 4'-ethoxy-4-biphenylyl α-methoxypropionamido-β-succinoyloxyethyl ketone is recrystallized from ethyl acetate and has the formula,

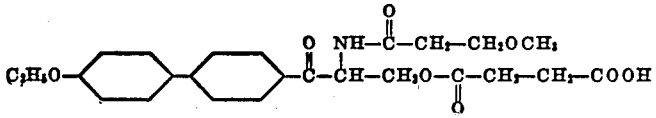

Example 11

0.054 g. of sodium methoxide is added to a solution consisting of 3 g. of 2-ethyl-4-biphenylyl α-crotonamido-β-hydroxyethyl ketone and 3 g. of ethyl crotonate in about 75 cc. of dry benzene and the mixture is heated for one hour. The alkali is neutralized by adding 1 cc. of 1 N hydrochloric acid and the benzene is evaporated. The residue, which consists of sodium chloride and the desired product, is extracted with ethylene dichloride, the extract filtered, and the desired compound crystallized from the filtrate. Recrystallization from ethyl acetate yields 2-ethyl-4-biphenylyl α-crotonamido-β-crotonyloxyethyl ketone of the formula,

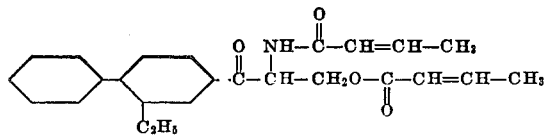

Example 12

5 g. of 4-biphenylyl α-bromoacetamido-β-hydroxethyl ketone and 10 g. of furoic anhydride is treated with one drop of concentrated sulfuric acid. The mixture is heated at 50° for one-half hour. 150 cc. of water is added and the mixture is adjusted to pH 8 with dilute sodium hydroxide. The precipitated product which consists of 4-biphenylyl α-bromoacetamido-β-furoyloxyethyl ketone is washed with water and recrystallized from ethyl acetate. Its formula is,

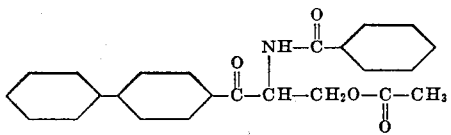

Example 13

A mixture consisting of 3 g. of 4-biphenylyl α-benzamido-β-hydroxyethyl ketone and 10 cc. of acetic anhydride is warmed to 40° C. and one drop of concentrated sulfuric acid is added to the solution. The mixture is allowed to stand for one-half hour and then is evaporated to dryness in vacuo. The residue which consists of 4-biphenylyl α-benzamido-β-acetoxyethyl ketone of the formula,

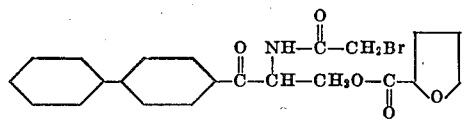

is washed with water and purified by recrystallization from ethanol.

Example 14

A mixture consisting of 2.5 g. of 4-biphenylyl α-acetamido-β-hydroxyethyl ketone and 10 cc. of acetic anhydride is warmed to 40° C. and one drop of concentrated sulfuric acid is added to the solution. The mixture is allowed to stand for one-half hour and then is evaporated to dryness in vacuo. The residue which consists of 4-biphenylyl α-acetamido-β-acetoxyethyl ketone of the formula,

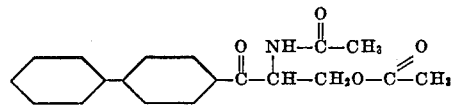

is recrystallized from methanol.

Example 15

A mixture consisting of 2.8 g. of 4-biphenylyl α-dichloroacetamido-β-hydroxyethyl ketone and 10 cc. of acetic anhydride is warmed to 40° C. and one drop of concentrated sulfuric acid is added to the solution. The mixture is allowed to stand for one-half hour and then is evaporated to dryness in vacuo. The residue which consists of 4-biphenylyl α-dichloroacetamido-β-acetoxyethyl ketone of the formula,

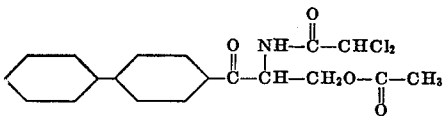

is recrystallized from methanol.

The biphenylyl α-acylamido-β-hydroxyethyl ketones used as the starting materials in the practice of the invention may be prepared according to the following scheme of reaction:

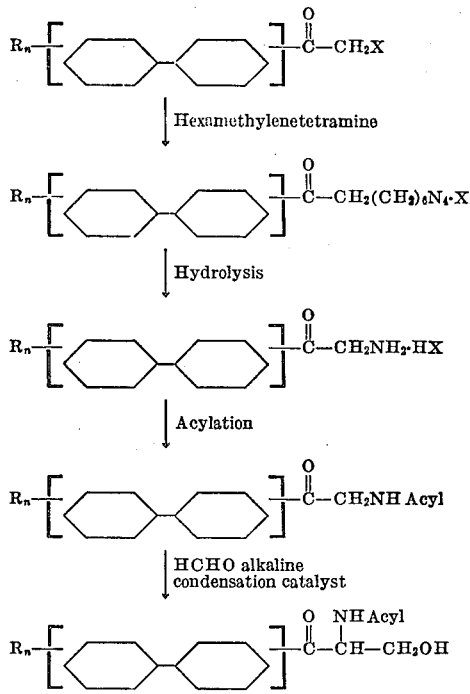

where R and $n$ have the same significance as given above and X is a halogen atom. For instance, the 4'-nitro-4-biphenylyl α-acetamido-β-hydroxyethyl ketone, used as the starting material in Example 3 is prepared as follows:

(a) 75 g. of hexamethylenetetramine dissolved in chloroform is added to 4'-nitro-4-biphenylyl bromomethyl ketone and the mixture allowed to stand at room temperature for about three hours. The 4'-nitro-4-biphenylyl bromomethyl ketone-hexamethylene tetramine complex is collected, washed with a little chloroform and dried. The formula of this product is,

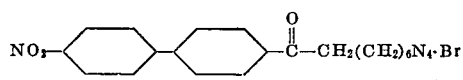

(b) 175 g. of the 4'-nitro-4-biphenylyl bromomethyl ketone hexamethylenetetramine complex is added to 200 cc. of concentrated hydrochloric acid in 1 liter of absolute alcohol and the mixture stirred overnight. The insoluble hydrochloride salt of 4'-nitro-4-biphenylyl aminomethyl ketone is collected by filtration, washed with a small amount of cold water and dried at room temperature. The formula of this product is,

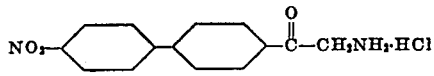

(c) The 4'-nitro-4-biphenylyl aminomethyl ketone hydrochloride prepared in (b) is dissolved in 500 cc. of glacial acetic acid and 300 cc. of acetic anhydride. 150 g. of sodium acetate is added in small portions with stirring. After the addition has been completed the solution is diluted with water and the 4'-nitro-4-biphenylyl acetamidomethyl ketone which separates collected and recrystallized from methanol; M. P. 154–5° C. The formula of this compound is,

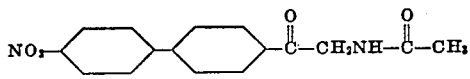

(d) 58 g. of 4'-nitro-4-biphenylyl acetamidomethyl ketone is mixed with 300 cc. of methanol and 75 cc. of 40% neutral formalin. 2 g. of sodium bicarbonate is added and the mixture stirred at room temperature for about an hour during which time the desired solid product separates. The insoluble 4'-nitro-4-biphenylyl α-acetamido-β-hydroxyethyl ketone of formula,

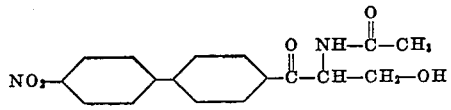

is collected and purified by recrystallization from ethyl acetate; M. P. 166–7° C.

Some of the subject matter disclosed but not claimed herein is described and claimed in my copending applications Serial Nos. 136,831, 136,832 and 136,833, all filed January 4, 1950, as continuations-in-part of my application Serial No. 83,778, now Patent No. 2,516,098.

What I claim is:

1. A compound of formula,

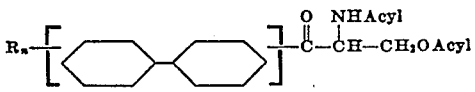

where $n$ is one of the integers 1 and 2 and R is a member of the class consisting of hydrogen, halogen, —$NO_2$, lower alkyl and lower alkoxy radicals.

2. A compound of formula,

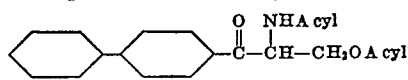

3. 4-biphenylyl α-benzamido-β-acetoxyethyl ketone.

4. 4-biphenylyl α-acetamido-β-acetoxyethyl ketone.

5. 4-biphenylyl α-dichloroacetamido-β-acetoxyethyl ketone.

6. A compound of formula,

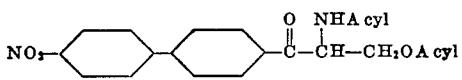

7. 4'-nitro-4-biphenylyl α-acetamido-β-acetoxyethyl ketone.

8. 4'-nitro-4-biphenylyl α-dichloroacetamido-β-acetoxyethyl ketone.

LOUIS L. BAMBAS.

No references cited.